(12) United States Patent
Dandabany

(10) Patent No.: US 8,463,880 B2
(45) Date of Patent: Jun. 11, 2013

(54) METHOD AND SYSTEM FOR REMOVING A TUNNEL BETWEEN PORTAL POINTS

(75) Inventor: Sankarlingam Dandabany, Rancho Cordova, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 474 days.

(21) Appl. No.: 12/079,014

(22) Filed: Mar. 24, 2008

(65) Prior Publication Data

US 2009/0240789 A1  Sep. 24, 2009

(51) Int. Cl.
*H06F 15/16* (2006.01)
(52) U.S. Cl.
USPC ........... 709/220; 709/221; 709/222; 370/331; 370/349; 370/238; 726/7; 726/11; 726/14
(58) Field of Classification Search
None
See application file for complete search history.

(56) References Cited

U.S. PATENT DOCUMENTS

| | | | |
|---|---|---|---|
| 7,010,607 B1 * | 3/2006 | Bunton | 709/228 |
| 7,054,321 B1 | 5/2006 | Nanji | |
| 7,089,312 B2 | 8/2006 | Liu et al. | |
| 7,123,587 B1 | 10/2006 | Hass et al. | |
| 7,171,685 B2 | 1/2007 | Batra et al. | |
| 7,233,569 B1 | 6/2007 | Swallow | |
| 7,529,203 B2 * | 5/2009 | Bajic et al. | 370/328 |
| 7,573,891 B1 * | 8/2009 | Chow et al. | 370/401 |
| 2002/0019904 A1 * | 2/2002 | Katz | 710/316 |
| 2003/0016679 A1 * | 1/2003 | Adams et al. | 370/401 |
| 2003/0084175 A1 * | 5/2003 | Kaniyar et al. | 709/230 |
| 2003/0086390 A1 * | 5/2003 | Eschbach et al. | 370/329 |
| 2003/0224758 A1 * | 12/2003 | O'Neill et al. | 455/411 |
| 2004/0062267 A1 * | 4/2004 | Minami et al. | 370/463 |
| 2005/0074015 A1 * | 4/2005 | Chari et al. | 370/400 |
| 2005/0163078 A1 * | 7/2005 | Oba et al. | 370/331 |
| 2006/0178147 A1 * | 8/2006 | Jagadeesan et al. | 455/436 |
| 2007/0082714 A1 * | 4/2007 | Beach et al. | 455/574 |
| 2007/0286177 A1 * | 12/2007 | Yamada et al. | 370/356 |

OTHER PUBLICATIONS https://learningnetwork.cisco.com/servlet/JiveServlet/previewBody/6014-102-1-19236/Subnetting%20Examples.pdf
"Subnetting Examples"—Jeremy Cioara CBT Nuggets Jun. 2006.*
http://www.watchguard.com/help/docs/v741WFSConfigurationGuide.pdf "WatchGuard Firebox System Configuration guide"—WatchGuard System Manager, Jun. 1998.*

* cited by examiner

*Primary Examiner* — Krista Zele
*Assistant Examiner* — Randy Scott

(57) ABSTRACT

Systems and methods of removing a tunnel created when a client having an active IP session with a first portal point in a first subnet of a network, disconnects from the first portal point and reconnects to a second portal point in a second subnet of the network, the client maintaining an IP address assigned to it by the first subnet, embodiments of the method including the steps of determining whether data is scheduled to transfer from the second portal point to the client; if no data is scheduled, disconnecting the client from the second portal point; deactivating the IP session, whereby the IP address is released to the first subnet; removing the tunnel; reconnecting the client to the second portal point; and activating a second IP session between the client and the second portal point, whereby a second IP address is assigned to the client by the second subnet.

18 Claims, 8 Drawing Sheets

METHOD AND SYSTEM FOR REMOVING A TUNNEL BETWEEN PORTAL POINTS

BACKGROUND OF THE INVENTION

The present invention relates generally to the useful art of computer software programming and more specifically to software relating to computer networks.

The Open Systems Interconnection Basic Reference Model (the "OSI Model") is a well-known, abstract description for communications and computer network protocol design, consisting of seven layers. A second, increasingly popular model is the TCP/IP model which describes a similar protocol in either four or five layers. While other layer models exist, the OSI and TCP/IP models are the most common. In each of these models, there exists a Network Layer (Layer 3) and a Data Link Layer (Layer 2).

The Network Layer provides the functional and procedural means of transferring variable length data sequences from a source to a destination by performing network routing functions. At a physical level, the Data Link Layer provides the functional and procedural means to transfer data between individual network entities, thus allowing for the transfer of data from a source to its ultimate destination in a network. Thus, the cumulative operations performed at the Data Link Layer allows for the transfer of data at the Network Level.

Networks can be either connection-oriented or connectionless. A connection-oriented network is one which identifies traffic flows by some connection identifier rather than by explicitly listing source and destination addresses. In contrast, for traffic in a connectionless network, packet headers are used to define the traffic's source and/or destination. Networks can also be either stateless or statefull. In a stateless network, network requests/activity is handled as an independent transaction. In contrast, in a statefull network, previous activity occurring within the network is considered when handling current network requests/activity.

Networks have many types of physical implementations, one of which is a Wireless Network and more specifically a Wireless Local Area Network ("WLAN"). A WLAN uses radio signals instead of wires as the communication medium to transmit data back and forth between clients (e.g., computers, cell phones, etc.) on the same network. This is accomplished by having clients exchange radio signals with a portal point physically connected to the network. A portal or access point includes any device that provides access to a WLAN (e.g., a wireless router). However, since radio signals have limited physical ranges, a client can lose a network connection if it moves out of the coverage area of a given portal point.

To better organize and distribute system resources, networks are often broken down into several mini-networks or subnets. For example, a single WLAN network (a layer-three network) in an office building could have ten subnets (each being a layer-two network), one on each of the ten floors, and each having a predefined allocation of the total system resources allocated to the entire network. These subnets provide a manageable way of granting and regulating seamless wireless network access. Thus, a client computer on a particular floor connects to a portal point within that floor's subnet and has access to the resources allotted to that subnet. Having multiple portal points in various locations in a network also helps to establish strong wireless connections by minimizing the distance between portal points and clients.

However, as would be expected with users in a WLAN, clients often move from place to place resulting in moving out of the coverage area of one portal point and into the coverage area of another. For example, consider a client connecting to the WLAN network on the first floor by connecting to a first portal point on a first subnet. When this connection is made, the client establishes layer-two connectivity to the first floor subnet. In addition, the client also establishes layer-three connectivity with the network. To accomplish layer-three connectivity, an IP address belonging to the first subnet is assigned to the client and an IP session between the network and the client is created. An IP session is a lasting connection using the layer-three network layer and becomes established when the connection is made. During this "lasting connection," the IP session is known as being active. When the connection is lost, the IP session becomes inactive (disconnected). Referring back to the floor example, if the client moves to the second floor, out of the coverage area of the first portal point, but into the coverage area of a second portal point on a second subnet, the layer-two connection to the first portal point is terminated. However, at that time, a new layer-two connection with the second portal point in the second subnet is created. Similarly, the initial IP session is terminated (becomes inactive) and reinitialized (becomes active) when the client reestablishes layer-two connectivity with the second subnet. When the new IP session is created, the client is assigned a new IP address from the second subnet.

In many circumstances, creating a new IP session with a new IP address is done seamlessly so as to produce no noticeable effect on the client. For example, a user using a client running a web browser is unlikely to notice when the current IP session is lost and the new IP session is created unless he is attempting to load a webpage at the exact moment when the change is taking place, and even then, only a slight and likely unnoticeable delay will result. However, in other applications, losing the IP address is not only noticeable, but precludes normal use of the application. For example, video conferencing and voice-over-IP (VOIP) applications require an uninterrupted IP session. Consider a user making a phone call using a VOIP application on a client VOIP device. While the user is able to maintain an active phone call while connected to the first portal point on the first floor, there can be a problem when the user moves to the second floor coverage area and attempts to continue an uninterrupted phone call. When the client disconnects from the first portal point and reconnects to the second portal point, the phone call will be lost. This lost phone call is due to the initial IP session being lost, as the VOIP application requires maintenance of a single IP session during the call.

One way to address the problem of lost IP sessions during use of such applications by the client, is to create a tunnel between the first portal point and the second portal point. A tunnel is a network protocol for encapsulated packets. The tunnel allows for the IP session to remain active, thus providing continuous layer-three connectivity even when layer-two connectivity is lost and then reestablished (i.e., when a client disconnects from the first portal point and reconnects to the second portal point). The tunnel thus allows the client to communicate to the first portal point by relaying data transmissions through the second portal point. Thus, in the above example, when a client moves from the first floor to the second floor and establishes a new layer-two connection with the second subnet, a new IP address is not assigned. Instead, the client maintains use of the original IP address assigned to it by the first subnet when the client originally connected to the first portal point. As the client communicates with the network, the data is transmitted to the second portal point, which then forwards the data to the first portal point to create the logical illusion that the client is still a member of the first subnet. Such tunneling of data occurs in both directions, thereby permitting a user to maintain uninterrupted VOIP phone calls or the like when moving between different portal points in different subnets across a WLAN.

While tunnels have the advantage of allowing mobile clients to roam between subnets while maintaining the same IP session, they also have several disadvantages. Specifically, tunnels cause network latency, as packets of data need to be tunneled to the original portal point before performing normal packet forwarding. Such routing demands additional use of network bandwidth, an important network resource. To minimize network latency, system administrators often implement architectural and design constraints placing limits on the number of tunnels that can simultaneously exist in a network.

DETAILED DESCRIPTION OF THE EMBODIMENTS OF THE INVENTION

While tunnels are beneficial, their utilization of system resources is undesirable and often unnecessary. For example, when a user initializes a VOIP phone call by having the client establish layer-two connectivity to first portal point in a first subnet, and subsequently moves out of the coverage area of the first portal point and into the coverage area of a second portal point in a second subnet, a tunnel is created to maintain the layer-three connection (by maintaining the initial IP session), thereby allowing the phone call to continue uninterrupted. However, when the user ends the call and later makes a second phone call, the tunnel is often still in place unless the established tunnel protocol is modified. Thus, the tunnel is likely to get used again during the second call. Under these circumstances, use of the tunnel is unnecessary as the client could end and begin a new IP session with the second subnet during the time period in between the two calls.

A similar problem results when a tunnel is created for an application that does not have the need for a continuous IP session. For example, a client computer that browses the web can briefly lose layer-three connectivity without having a significant effect on the user. However, when a client engaging in web browsing activity moves from one subnet to another, a tunnel may still be created depending on the tunnel-creation rules implemented in the network. This results because tunnels are typically created in a network regardless of the application being run by the client. Again, the tunnel does more harm than good as it makes unnecessary use of valuable system resources while providing little or no benefit to the user.

The solution to these problems of having unnecessary tunnels in a network is a method and system of removing a tunnel such that system resources can be preserved while causing little or no effect on mobile users. This is accomplished by removing the tunnels during periods of data inactivity between the client and the new portal point. Thus, if properly executed, it is likely that no data will be delayed during the time in which the layer-three connectivity is lost and the time it is reestablished with a new IP session. It is noted that while periods of data inactivity exist when the client is off (i.e. when the client is powered down), these periods of data activity can also occur when the client is on.

Figure 1:
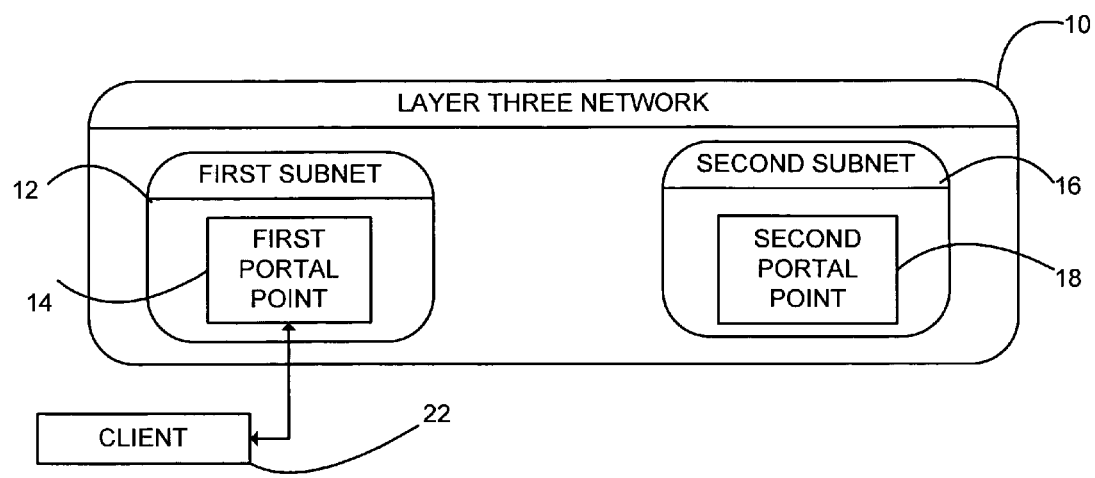
FIG. 1 is a network system without a tunnel.

Turning now to FIG. 1, a layer-three network 10, is shown in a state prior to the creation of a tunnel. Included in the network 10 is a first subnet 12 with a first portal point 14 and a second subnet 16 with a second portal point 18. A client 22 has layer-two connectivity with the subnet 12, the client having been assigned an IP address from the first subnet, at which time a layer-three IP session became active.

Figure 2:
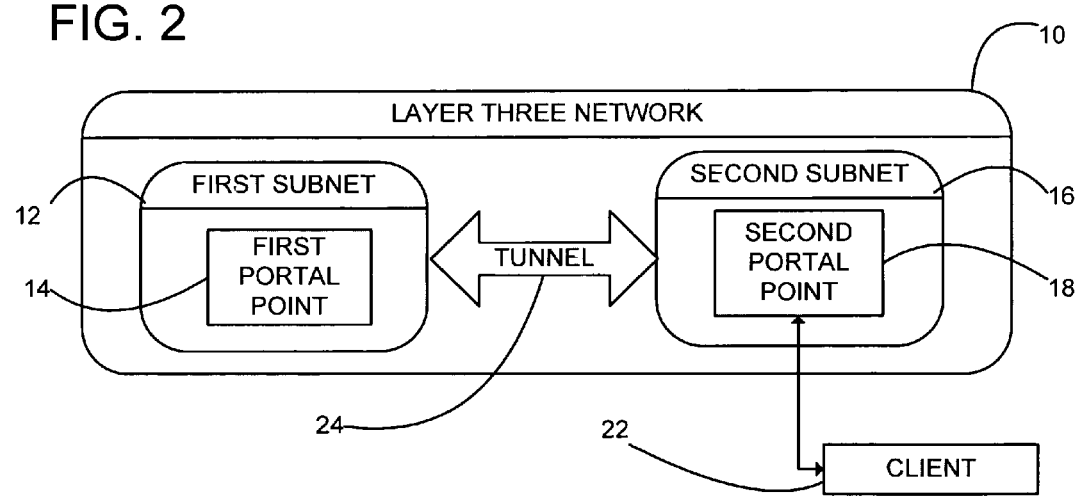
FIG. 2 is a network system with a tunnel.

Turning now to FIG. 2, the network 10, is shown in a state wherein the network has responded to movement of the client 22 into the coverage area of the second portal point 18 and out of the coverage area of the first portal point 14. The client 22 disconnects from the first portal point 14, losing layer-two connectivity from the first subnet 12, and reconnects with the second portal point 18, reestablishing layer-two connectivity with the second subnet 16. A tunnel 24 is created between the first portal point 14 and the second portal point 18 such that the client 22 maintains the IP address assigned to it by the first subnet 12. Thus, data is able to be transferred between the first portal point 14 and the client 22 through the second portal point 18 as if the client were communicating directly with a portal point in the first subnet.

Figure 3:
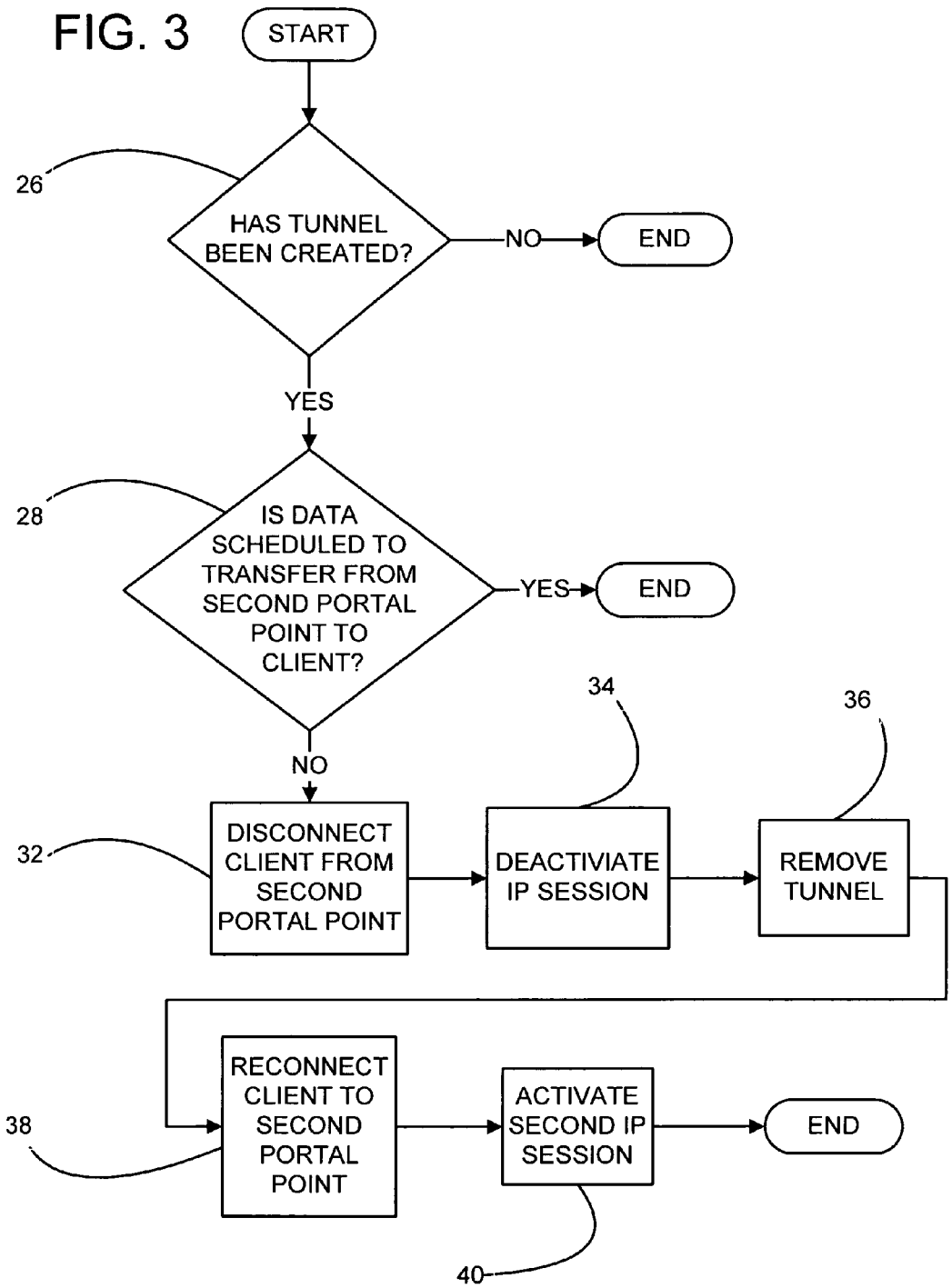
FIG. 3 is a flowchart illustrating the operating steps of a first embodiment of the method of the present invention.

Turning now to FIG. 3, in a first embodiment, a method of removing a tunnel includes the steps of: determining whether the tunnel has been created (step 26); if so, proceeding to the step of determining whether data is scheduled to transfer from the second portal point to the client (step 28); if no data is scheduled, performing a subgroup of steps including disconnecting the client from the second portal point (step 32); deactivating the IP session, whereby the IP address is released to the first subnet (step 34); removing the tunnel from the network (step 36); reconnecting the client to the second portal point (step 38); and activating a second IP session between the client and the second portal point, whereby a second IP address is assigned to the client by the second subnet (step 40).

Figure 4:
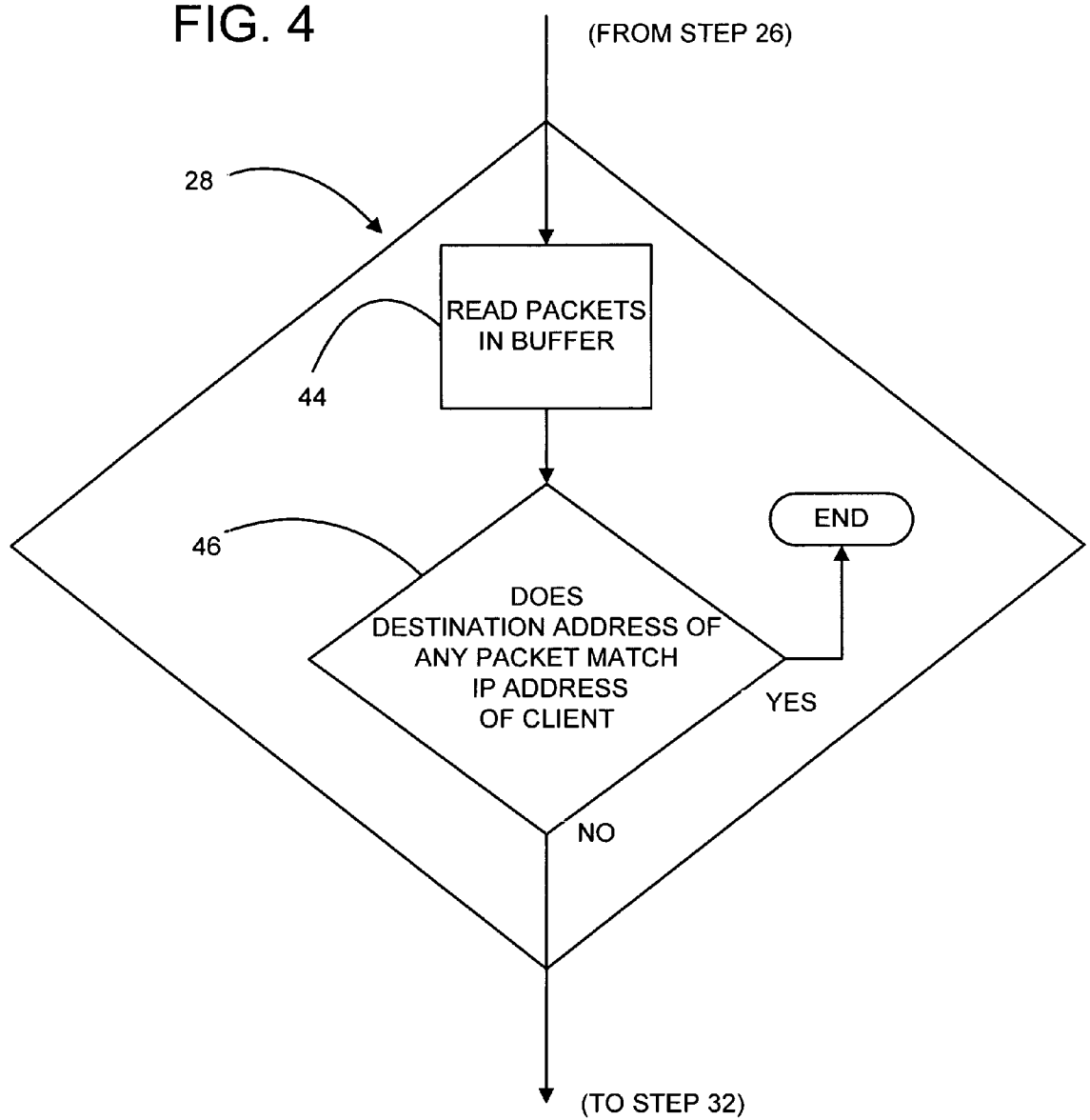
FIG. 4 is a flowchart illustrating the operating steps of a second embodiment of the method of the present invention.

The step 28 of determining whether data is scheduled to transfer from the second portal point to the client can be accomplished in several ways, including but not limited to monitoring at least one buffer in the second portal point, the buffer being used for storing outgoing data packets, each packet having a destination address. Turning now to FIG. 4, in a second embodiment of a method for removing a tunnel, layer-three connectivity is disconnected and reconnected at a time when there is no data scheduled to be transferred to the client. The second embodiment is equivalent to the first embodiment except that the determining step 28 is carried out by reading the packets in the buffer (step 44); determining whether the destination address of any packet in the buffer matches the IP address of the client (step 46); and if no match is found, proceeding to step 32 (since no data was found to be scheduled to transfer from the second portal point to the client). Thus, when no data is scheduled to be transferred to the client, there exists an opportunity to disconnect and reconnect layer-three connectivity without disrupting data transfer.

Figure 5:
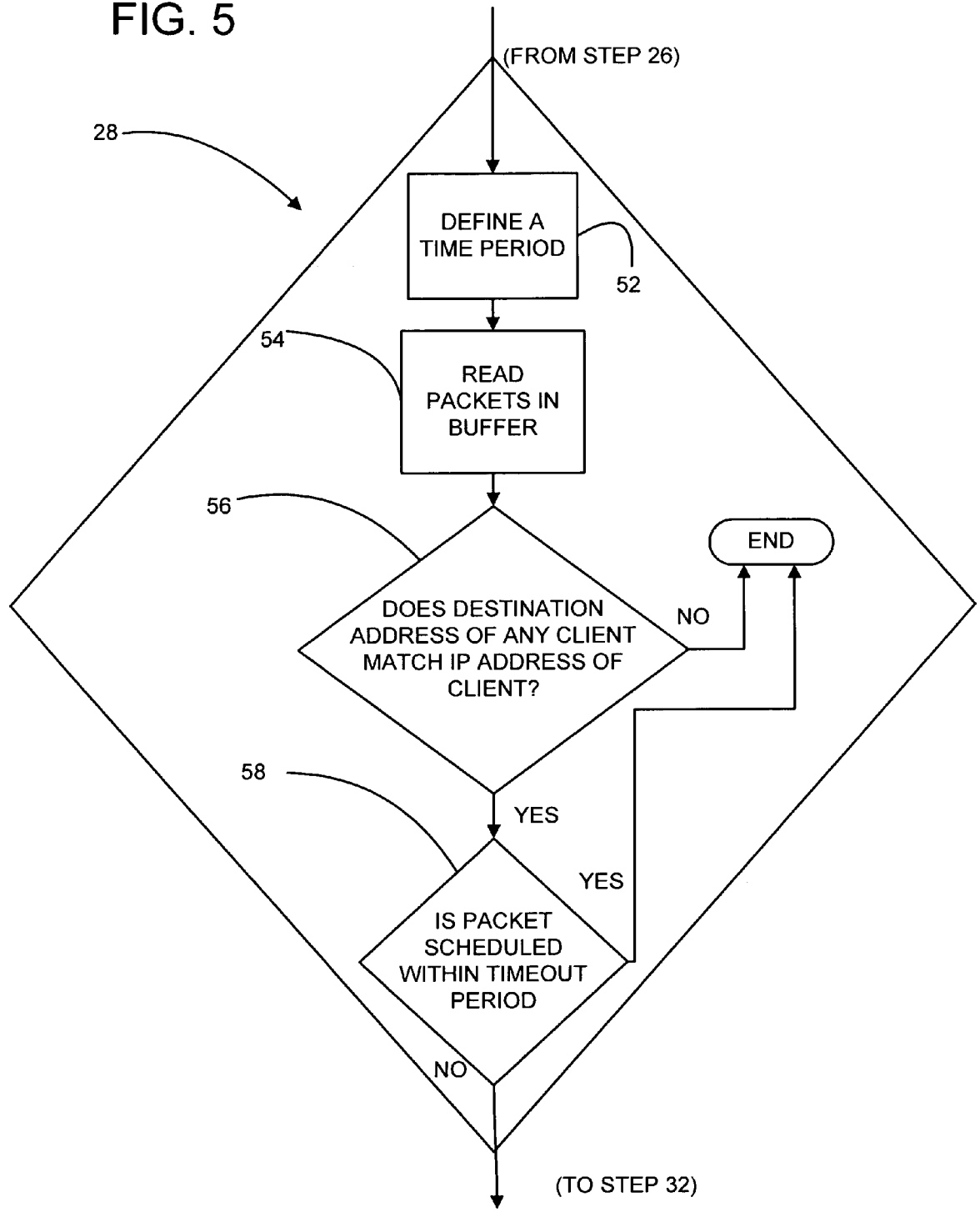
FIG. 5 is a flowchart illustrating the operating steps of a third embodiment of the method of the present invention.

Turning now to FIG. 5, in a third embodiment of a method of removing a tunnel, layer-three connectivity is disconnected and reconnected at a time when there is data scheduled to be transferred to the client, but there nonetheless remains enough time to disconnect and reconnect layer-three connectivity without affecting the transfer of data to the client. The third embodiment is equivalent to the first embodiment except that the determining step 28 is carried out by defining a timeout period (step 52); reading the packets in the buffer (step 54); determining whether the destination address of any packet in the buffer matches the IP address of the client (step 56); for each match found, determining whether the packet is scheduled to transfer from the second portal point to the client within the timeout period (step 58); and if no packet is scheduled to transfer within the timeout period, proceeding to step 32 (since no data was found to be scheduled to transfer from the second portal point to the client). If a packet is scheduled to transfer within the timeout period, data is considered to be scheduled to transfer from the second portal point to the client.

Figure 6:
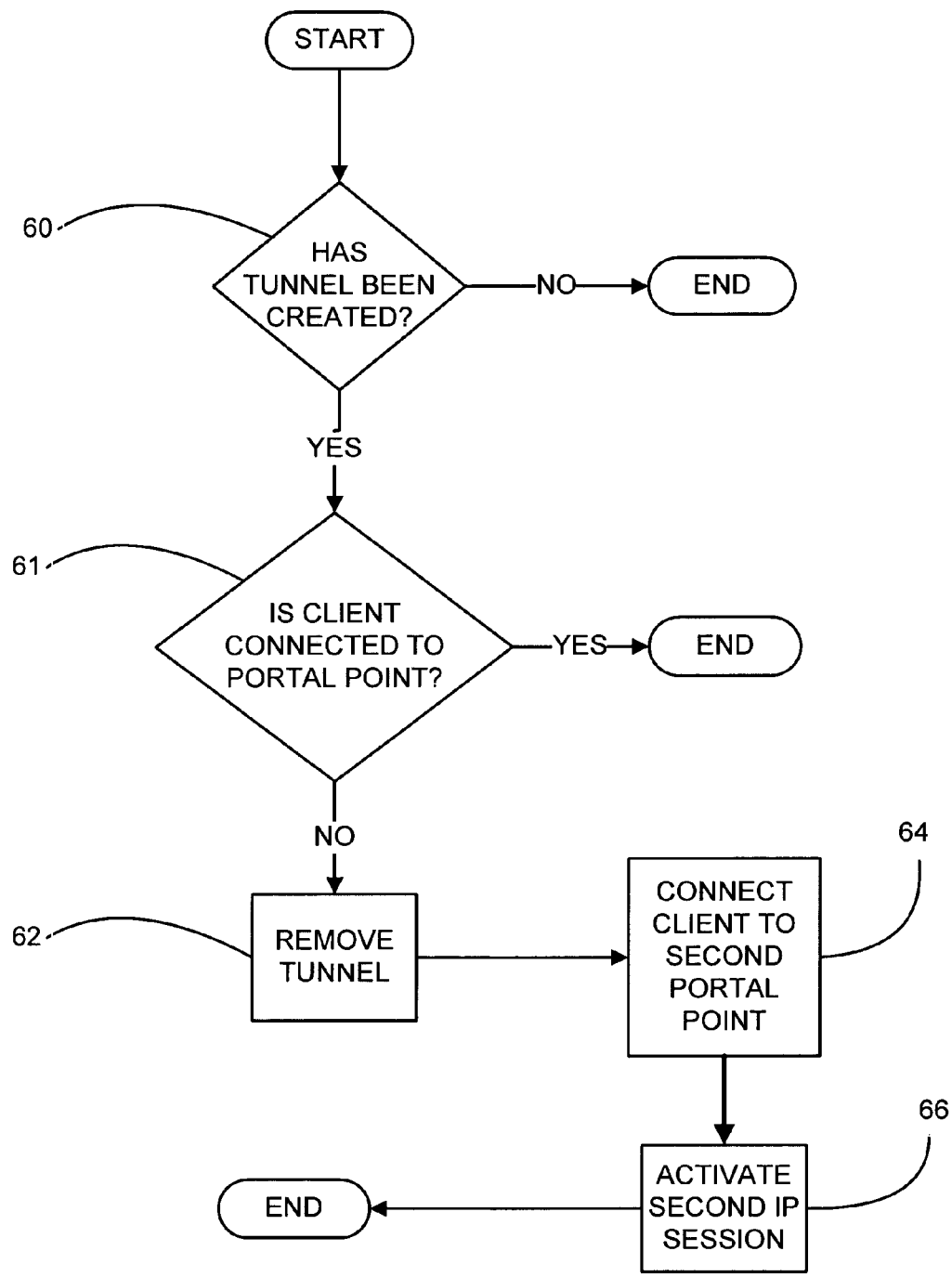
FIG. 6 is a flowchart illustrating the operating steps of a fourth embodiment of the method of the present invention.

Turning now to FIG. 6, a fourth embodiment of a method of removing a tunnel includes the steps of determining whether the tunnel has been created (step 60); if so, proceeding to the step of determining whether the client is connected to the second portal point (step 61); if the client is not connected, performing a subgroup of steps including removing the tunnel (step 62); connecting the client to the second portal point (step 64); and activating a second IP session between the client and the second portal point, whereby a second IP address is assigned to the client by the second subnet (step 66).

The step 61 of determining whether the client is connected to the second portal point can be accomplished in several ways, including but not limited to checking to see if the client is in a power-save mode or if the IP session is inactive.

Figure 7:
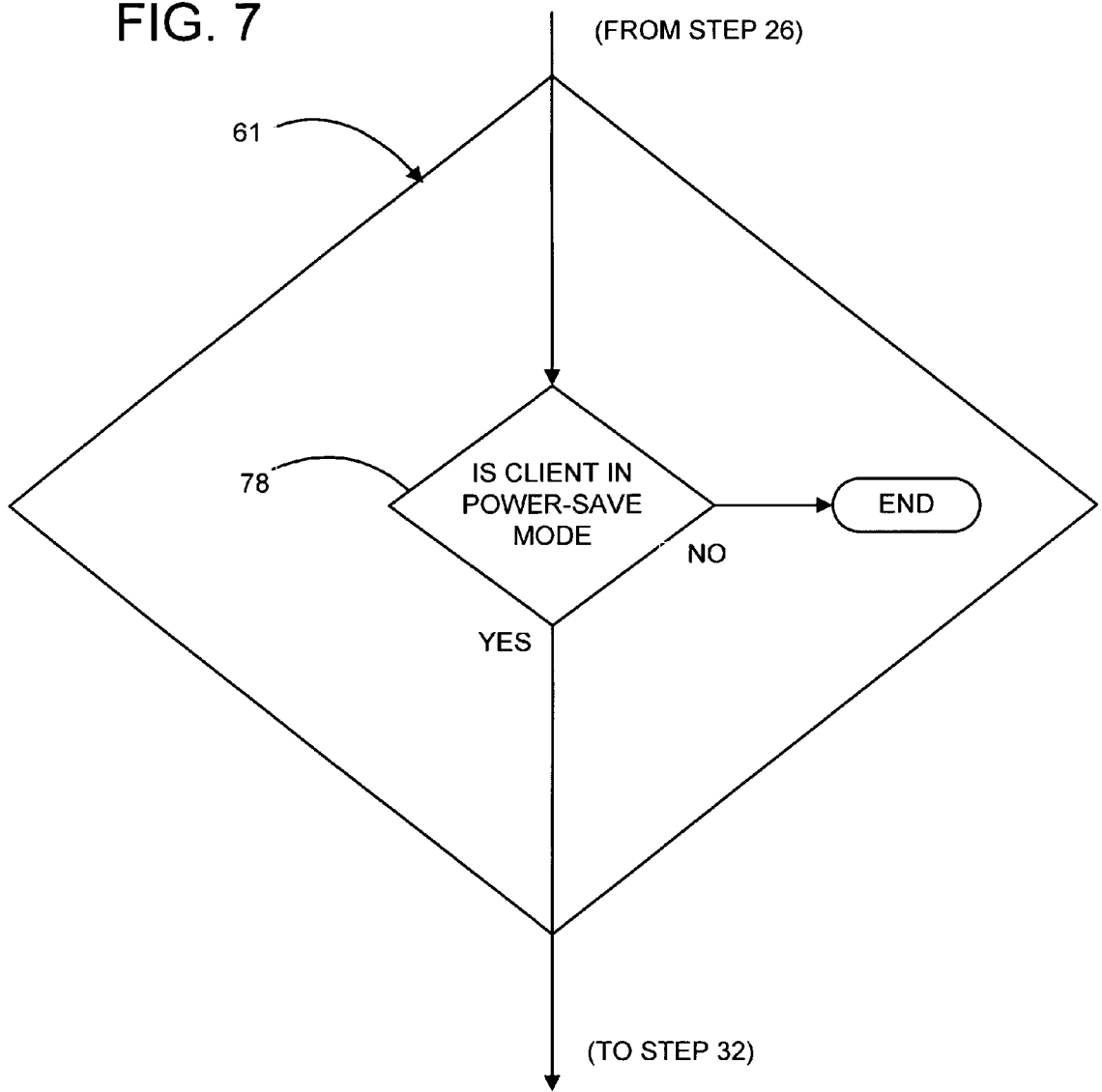
FIG. 7 is a flowchart illustrating the operating steps of a fifth embodiment of the method of the present invention.

Turning now to FIG. 7, in a fifth embodiment of a method for removing tunnels, layer-three connectivity is disconnected and reconnected at a time when the client is in a power-save mode. The fifth embodiment is equivalent to the fourth embodiment except that the client has two modes, a normal mode and a power-save mode wherein the determining step 61 is carried out by determining whether the client is in the power-save mode (step 78). To indicate it is in power-save mode, the client sends a power-save signal to the second portal point. If the client is in power-save mode, the method of the fifth embodiment proceeds to step 32 (since it is determined that the client is not connected to the second portal point).

Figure 8:
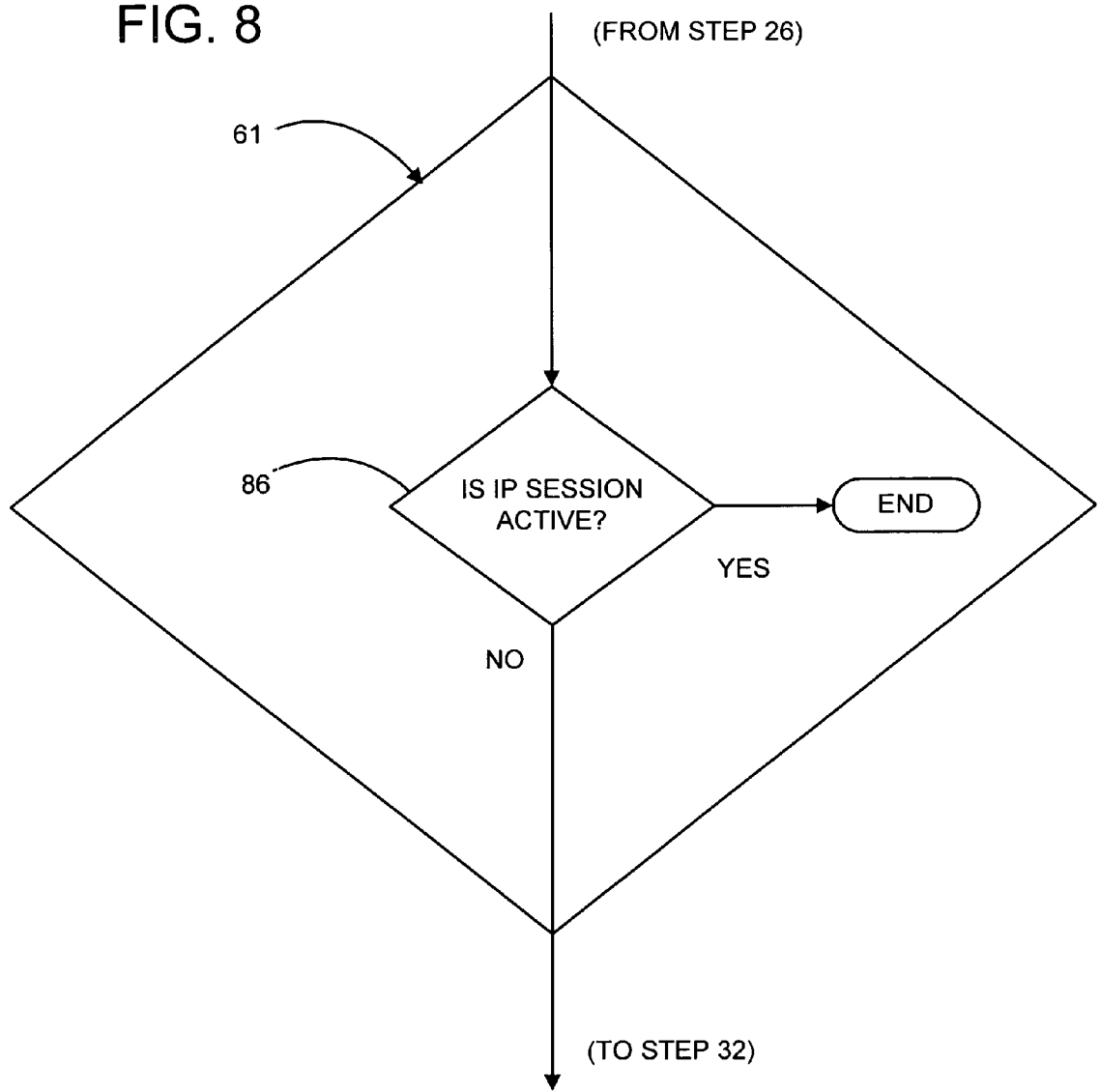
FIG. 8 is a flowchart illustrating the operating steps of a sixth embodiment of the method of the present invention.

Turning now to FIG. 8, in a sixth embodiment of a method for removing a tunnel, layer-three connectivity is disconnected and reconnected at a time when the IP session of the client is inactive. The sixth embodiment is equivalent to the fourth embodiment expect that the determining step 61 is carried out by determining whether the IP session is active (step 86); and if the IP session is not active, the method of the sixth embodiment proceeds to step 32 (since it is determined that the client is not connected to the second portal point).

Figure 9:
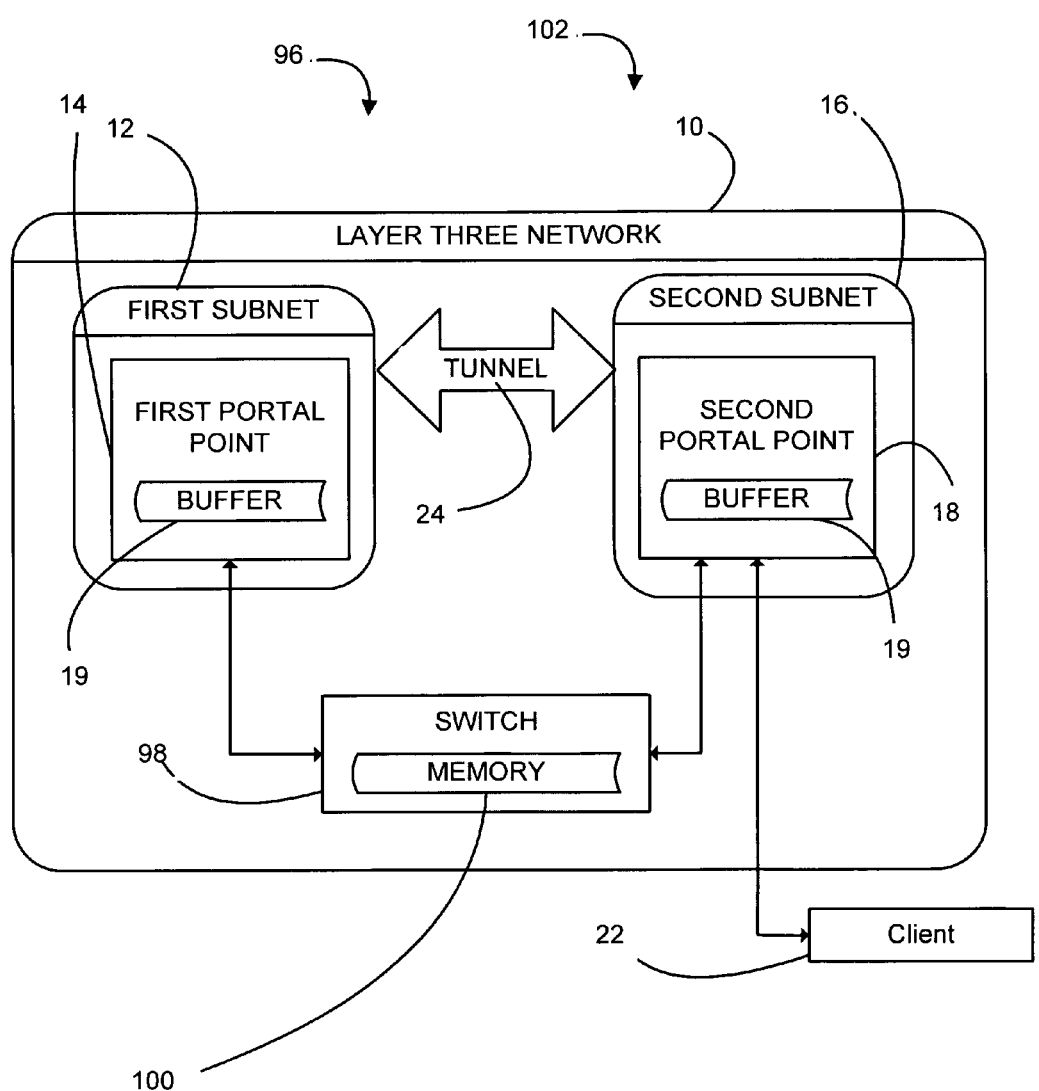
FIG. 9 is a network system showing a seventh embodiment a network system of the present invention.

Turning now to FIG. 9, a more detailed network system of FIGS. 1 and 2 is shown. It is noted that in each of the above six method embodiments, it is preferred that a switch 100 is connected to at least one portal point, but preferably to the first portal point 14 and the second portal point 18, wherein the steps performed in the corresponding embodiment are executed by a program stored in a memory 98 contained in the switch 100. It is noted that the steps could also be executed by a program stored in a memory in another device in the network (e.g., a memory in a portal point).

A seventh embodiment is a network system 96 including a network with at least two subnets and at least two portal points, a first portal point 14 in a first subnet 12 and a second portal point 18 in a second subnet 16. Each portal point 14, 18 includes a buffer 19 for storing outgoing packets. Further included is at least one client 22 connected to the second portal point 18 and having an IP address assigned to the client 22 by the first subnet 12. Also included in the system is a tunnel 24 between the first portal point 14 and the second portal point 18, the tunnel being removed when client 22 is on and the second portal point 18 determines that no data is scheduled to transfer from the second portal point 18 to the client 22. Preferably, at least one switch 98 is connected to the portal points, the switch having a memory 100 with a set of instructions for determining whether data is scheduled to transfer from the second portal point 18 to the client 22. It is noted that such instructions could alternatively be placed in a memory of another component in the network (e.g., a portal point) and that additional instructions (i.e., those described in the method embodiments above, could be stored in the memory).

An eight embodiment is a layer-three network architecture 102 for providing seamless mobility to a client moving between at least two subnets while preventing disruptions in layer-three communications, the architecture using a minimum number of tunnels between the subnets. The architecture 102 includes at least two portal points, a first portal point 14 in a first subnet 12 and a second portal point 18 in a second subnet 16 with at least one client 22 connected to the second portal point and having an IP address assigned to the client by the first subnet. Further included is at least one tunnel 24 between the first portal point 14 and the second portal point 18, the tunnel being removed when the client 22 is on and the second portal point 18 determines that no data is scheduled to transfer from the second portal point to the client.

While several particular embodiments of a method and system for removing a tunnel between portal points have been described herein, it will be appreciated by those skilled in the art that changes and modifications may be made thereto without departing from the invention in its broader aspects and as set forth in the following claims.

What is claimed is:

1. A method, comprising implementing a tunnel in a layer-three network, said tunnel preserving an active Internet Protocol (IP) session between a client device and a first portal point corresponding to a first subnet of the layer-three network by way of a connection between the client device and a second portal point corresponding to a second subnet of the layer-three network, said tunnel enabling the client device to maintain an IP address allocated to the first subnet and assigned to the client device by the first subnet;

examining a buffer of outgoing packets scheduled to be transmitted in the future to determine whether data is scheduled to transfer from the second portal point to the client device in the future;

in response to determining that no data is scheduled to transfer from the second portal point to the client device in the future, removing the tunnel by:

disconnecting the client device from the second portal point;

deactivating the IP session between the client device and the first portal point such that the IP address allocated to the first subnet and assigned to the client device is released to the first subnet;

reconnecting the client device to the second portal point; and activating a second IP session between the client device and the second portal point such that a second IP address allocated to the second subnet is assigned to the client device by the second subnet;

wherein the tunnel is not removed in response to determining that data is scheduled to transfer from the second portal point to the client device in the future.

2. The method of claim 1 further comprising determining whether the tunnel has been created.

3. The method of claim 1, wherein the second portal point includes said buffer of outgoing data packets, each outgoing data packet having a destination address, said determining whether data is scheduled to transfer from the second portal point to the client device further comprising:

reading the outgoing data packets in the buffer;
determining whether the destination address of any outgoing data packet in the buffer matches the IP address of the client device; and
if no match is found, specifying that no data is scheduled to transfer from the second portal point to the client device.

4. The method of claim 1, wherein the second portal point includes said buffer for storing outgoing data packets, each packet having a destination address, said determining whether data is scheduled to transfer from the second portal point to the client device further comprising:

defining a timeout period;
reading the packets in the buffer;
determining whether the destination address of any packet in the buffer matches the IP address of the client device;
for each match found, determining whether the packet is scheduled to transfer from the second portal point to the client device within said timeout period; and
if no packet is scheduled to transfer within said timeout period, specifying that no data is scheduled to transfer from the second portal point to the client device.

5. The method of claim 1 wherein said determining, said removing, said reconnecting, and said activating are performed by a processor executing a program stored in a memory contained in the second portal point.

6. The method of claim 1 wherein the network further includes a switch connected to at least two portal points, including the first portal and the second portal point, wherein said determining, said removing, said reconnecting, and said activating are performed by a processor executing a program stored in a memory contained in the switch.

7. A method, comprising:
implementing a tunnel in a layer-three network, said tunnel preserving an active Internet Protocol (IP) session between a client device and a first portal point corresponding to a first subnet of the layer-three network by way of a connection between the client device and a second portal point corresponding to a second subnet of the layer-three network, said tunnel enabling the client device to maintain an IP address allocated to the first subnet and assigned to the client device by the first subnet;
in response to determining that no data is scheduled to transfer to the client device over the tunnel in the future, allowing the client device to disconnect from the second portal point;
determining whether the client device has disconnected from the second portal point;
if the client device has disconnected from the second portal point:
removing the tunnel;
connecting the client device to the second portal point; and activating a second IP session between the client device and the second portal point, such that a second IP address is assigned to the client by the second subnet.

8. The method of claim 7 further comprising determining whether the tunnel has been created.

9. The method of claim 7 wherein the client device has two modes, a normal mode and a power-save mode, said determining whether the client device has disconnected from the second portal point further comprising:
determining whether the client device is in the power-save mode; and
if the client device is in power-save mode, specifying that the client device is not connected to the second portal point.

10. The method of claim 9 further comprising:
the client device sending a power-save signal to the second portal point; and
the second portal point analyzing said signal to determine whether the client device is in said power-save mode.

11. The method of claim 7, said determining whether the client device has disconnected from the second portal point further comprising:
determining whether the IP session between the first portal point and the client device is active; and
if the IP session between the first portal point and the client device is not active, specifying that the client device is not connected to the second portal point.

12. The method of claim 11 wherein the network is one of a connection-oriented network or a connectionless network.

13. The method of claim 11 wherein the network is one of a stateful network or a stateless network.

14. The method of claim 7 wherein said determining, said removing, said connecting, and said activating steps are performed by a processor executing a program stored in a memory contained in the second portal point.

15. The method of claim 7 wherein the network further includes a switch connected to at least two portal points, including the first portal point and the second portal point, wherein said determining, said removing, said reconnecting, and said activating steps are performed by a processor executing a program stored in a memory contained in the switch.

16. A network system comprising:
a layer-three network;
at least two subnets within said network;
at least two portal points, a first portal point in a first subnet and a second portal point in a second subnet;
at least one client device connected to said second portal point and having an Internet Protocol (IP) address assigned to said client by said first subnet;
said first portal point and said second portal point implementing a tunnel between said first portal point and said second portal point such that said tunnel enables said at least one client device to maintain an IP session with said first subnet using said IP address assigned to said client by said first subnet, said tunnel being removed when said client device is on and in response to said second portal point determining that no data is scheduled to transfer from said second portal point to said client device in the future,
wherein said tunnel is not removed in response to said second portal point determining that data is scheduled to transfer from said second portal point to said client device in the future.

17. The network system of claim 16 further comprising:
a memory in one of said at least two portal points, said memory having a set of instructions for determining whether data is scheduled to transfer from said second portal point to said client device in the future.

18. The network of claim 16 further comprising:
at least one switch in said network being connected to said at least one portal point;
a memory in said at least one switch, said memory having a set of instructions for determining whether data is scheduled to transfer from said second portal point to said client device in the future.

* * * * *